United States Patent [19]

Nawa et al.

[11] Patent Number: 4,493,971
[45] Date of Patent: Jan. 15, 1985

[54] HOT WIRE TYPE ELECTRIC ARC WELDING TORCH

[75] Inventors: Akiyoshi Nawa; Takao Shimizu, both of Aichi, Japan

[73] Assignee: Mitsubishi Denki Kabushiki Kaisha, Tokyo, Japan

[21] Appl. No.: 455,178

[22] Filed: Jan. 3, 1983

[30] Foreign Application Priority Data

Jan. 8, 1982 [JP] Japan ................................ 57-1111[U]

[51] Int. Cl.³ ............................................. B23K 9/00
[52] U.S. Cl. .............................. 219/137.52; 219/136; 219/137.61
[58] Field of Search ............... 219/74, 75, 76.1, 76.14, 219/76.15, 76.16, 121 RR, 130.01, 136, 137.61, 137.52

[56] References Cited

FOREIGN PATENT DOCUMENTS 1063290  7/1952  France .......................... 219/137.61
1144606  3/1969  United Kingdom ........... 219/137.52

Primary Examiner—Roy N. Envall, Jr.
Assistant Examiner—C. Sigda
Attorney, Agent, or Firm—Sughrue, Mion, Zinn, Macpeak, and Seas

[57] ABSTRACT

A hot wire type electric arc welding torch includes a wire heating unit which has a first guide hole therein disposed substantially parallel to a welding torch. An insulative guide is connected to the wire feeding unit and supplies a wire to the welding torch at an angle which is inclined relative to the first guide hole. An insulative spacer is disposed in the wire feeding unit, and the insulative spacer has a guide hole therein which forms an angle with the first guide hole for bending the wire. Tapered escape hole portions are formed at wire inlet and outlet sides of the insulative spacer to minimize friction.

8 Claims, 5 Drawing Figures

HOT WIRE TYPE ELECTRIC ARC WELDING TORCH

FIELD OF THE INVENTION

The present invention relates to an improved hot wire type electric arc welding torch.

BACKGROUND OF THE INVENTION

U.S. Pat. Nos. 3,122,629 and 3,163,743 disclose nonconsumable electrode electric arc welding processes which utilize a so-called hot wire system. According to these processes, an electric current is passed through a wire which produces Joule heat therein, the amount being $I^2R$ where I is the value of the current and R is the wire resistance. While the wire is thus heated, it is fed to an electric arc zone, and welding is carried out. In accordance with this process, is is possible to greatly increase the amount of welding as compared with the process where the filler wire is fed without being heated as described above. However, the process where the wire is separately heated requires two relatively large torches—i.e., a torch for the generation of an electric arc and a torch for heating the filler wire; and therefore, this process is not suitable for hand welding.

In order to make possible hand welding according to the above-described wire heating process, it is necessary to combine the two torches together in one unit and to miniaturize the torches as much as is possible for practical use. To achieve maximum miniaturization, it is desirable to employ a structure where a wire-heating torch is fixed at an attitude which is parallel to a TIG (tungsten inert gas) torch, so that only a top portion of the wire is inclined toward the TIG torch. Thus, there have been proposed apparatuses as shown in FIGS. 1 and 2.

In the conventional apparatuses of these figures, an electrode 2, made of tungsten, is held in a TIG torch 1 coaxially. An arc 6 and a weld puddle 28 are shielded by a shield-gas 7 from a shielding nozzle 3. A wire-heating torch portion is secured to the TIG torch 1 by means of a holder 4. A sliding piece 8 is designed so that it moves up and down in a cylindrical slide base 9 which is fitted firmly to the holder 4. An adjusting nut 12 is positioned in a notched portion of the slide base 9 and is in engagement with a big screw formed in an upper portion of the sliding piece 8. Therefore, when the adjusting nut 12 is turned, it does not move up and down, and accordingly the sliding piece 8 travels up and down. A guide groove is provided in the sliding piece 8 for preventing rotation, and a knob 11 fitted to the slide base 9 is engaged with the guide groove. A guide 27 is screwed to a lower portion of the sliding piece 8 in such a manner that the guide's extended line is directed toward the electrode 2. An insulative guide 26 is fitted into the interior of the guide 27, and similarly, an insulative tube 10 is fitted into the interior of the sliding piece 8. A small diameter hole is bored in the insulative guide 26 and the insulative tube 10 which is sufficiently large so that a wire 5 can pass through the hole. The wire is fed to the arc zone 6. A conduit cable 20 is fitted in the center of a power supply device 18, and the other end is connected to a wire-heating power source 21. A power supply tip 13 is screwed to the power supply device 18 through an insulated cap nut 14. By screwing the cap nut 14 to the sliding piece 8, the power supply tip 13 and the power supply device 18 are attached electrically while being insulated from the environment. The power supply device 18 is covered with an insulative tube 19.

The electric arc 6 is generated between a workpiece 22 to be welded and the electrode 2, and the weld puddle 28 is formed by the arc heat.

Next, the operating procedure of the abovedescribed conventional apparatus is described.

First, the adjusting nut 12, screwed to the sliding piece 8, is turned to move the sliding piece 8 up and down until the location of the end of the wire 5 is positioned properly with respect to the electrode 2. The wire 5, fed into the conduit cable 20 from a wire-feeding apparatus (not shown), passes through the power supply tip 13, and is sent to the weld puddle 28 by means of the insulative tube 10 and the insulative guide 26. A wire-heating current is supplied from the wire-heating power source 21 through the copper wire 17 and the power supply device 18 to the power supply tip 13. A lower end of the power supply tip 13 supplies the current to the wire 5. Since the wire 5 is insulated along its length by the insulative tube 10 and the insulative guide 26, the wire-heating current flows through the wire 5, the weld puddle 28, and the workpiece to the wire-heating power source 21. At this time, the wire 5 is heated to near its melting point by the $I^2R$ heating caused by the resistance (R) between the lower end of the power supply tip 13 and the weld puddle 28 and the current (I) flowing therethrough. Thus, the wire 5 is easily melted by the $I^2R$ heating in combination with the heat from the arc 6 and the heat conserved by the weld puddle 28, and the melted wire is deposited on the workpiece 22. Since, as described above, the top end of the wire 5 is heated to near its melting point, it is required for the insulative tube 10 and the insulative guide 26 to be made of material having heat resistance and insulative properties (e.g., ceramics).

In passing through the wire-guide hole of the insulative tube 10, the heated wire 5 comes into contact with a portion A of the insulative tube 10 (FIG. 2), and thus, the heated wire 5 enters the wire-guide hole of the insulative guide 26 while contacting the portion A. When the wire 5 contacts the portion A, a contact reaction results, which prevents the wire 5 from smoothly entering the inclined hole provided at a wire insert angle of $\theta°$ in the insulative tube 10. Therefore the wire again contacts the insulative tube 10 at a second portion B as shown in FIG. 2. The coefficient of friction between a wire in a heated condition, i.e., a "hot wire", and the insulative tube 10 made of an insulative material, such as a ceramic, is several times that between a wire which is not heated, i.e., a "cold wire", and the ceramic insulative tube 10.

Since the conventional hot wire type electric art weld-torch is designed as described above, the heated wire is abruptly bent at a bent portion of the wire-guide path. This increases the resistance encountered in feeding the wire and makes it difficult to feed the wire continuously and stably. When the diameter "d" of the wire-guide path is increased, although the resistance encountered in feeding the wire drops, the wire always comes into contact with the tube 10 at at least two points located at the portions A and B. Therefore, the greater the diameter "d", the more readily the wire moves in a zigzag direction through the path. Thus, many difficulties are encountered in feeding the wire continuously and stably.

SUMMARY OF THE INVENTION

The present invention is intended to overcome the above-described defects of the conventional apparatuses, and the object of the invention is to provide a hot wire type electric arc welding torch in which the wire-guide path is provided at a bent portion thereof with a guide which is designed so as to conform to the curvature radius of the wire.

The present invention relates to a hot wire type electric arc welding torch which comprises a non-consumable electrode, a shielding gas nozzle which surrounds the non-consumable electrode and which discharges a shielding gas around the non-consumable electrode, a welding torch which generates an electric arc between the non-consumable electrode and a workpiece to be welded, a wire feeding unit located substantially parallel to the welding torch for feeding a wire through a first guide hole therein, a first guide connected to the wire feeding unit for guiding the wire at an inclined angle towards the welding torch, the first guide having an insulated second guide therein, an insulated spacer for guiding the wire from the wire feeding unit to the insulated second guide, the insulated spacer having a second guide hole therein which forms an angle with the first guide hole and which hands the guide wire, the insulated spacer also having tapered escape hole portions formed at the wire inlet and outlet sides of the insulated spacer.

BRIEF DESCRIPTION THE DRAWINGS

DETAILED DESCRIPTION THE PREFERRED EMBODIMENTS

Figure 1:
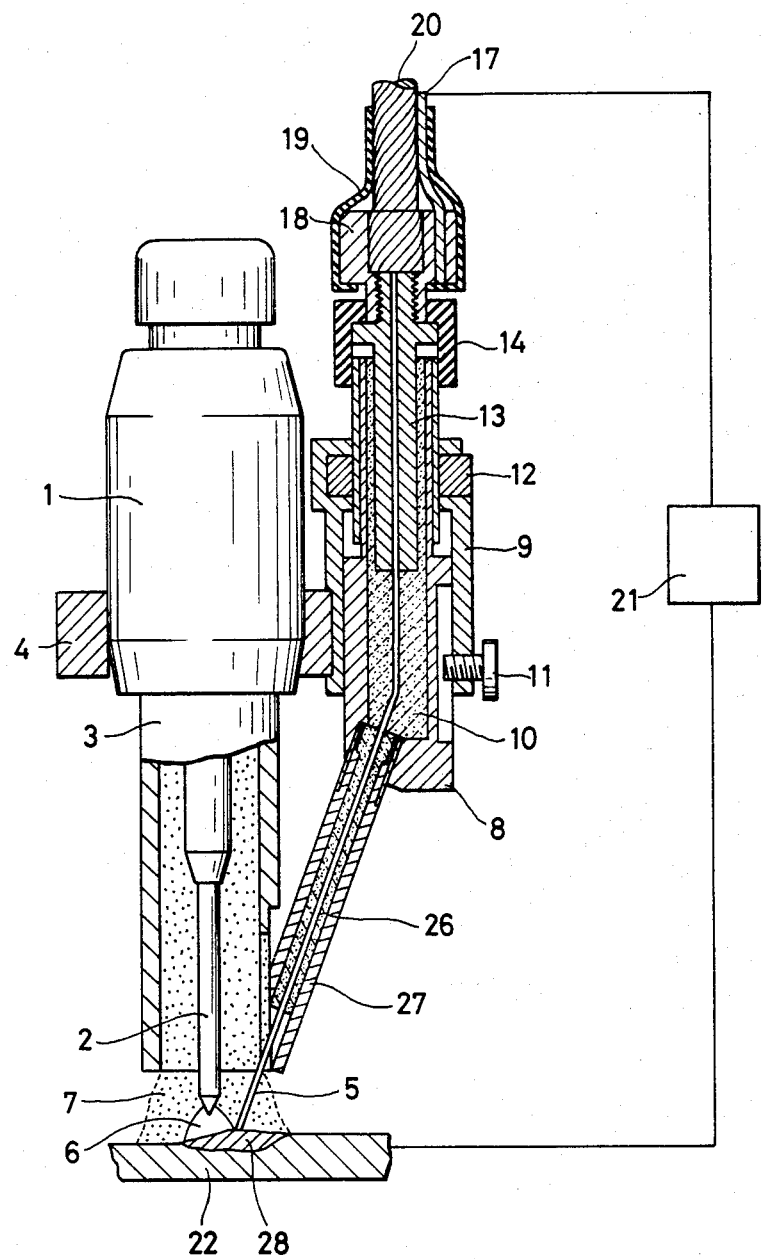
FIG. 1 is a cross-sectional view of a conventional hot wire type electric arc welding torch.
Figure 2:
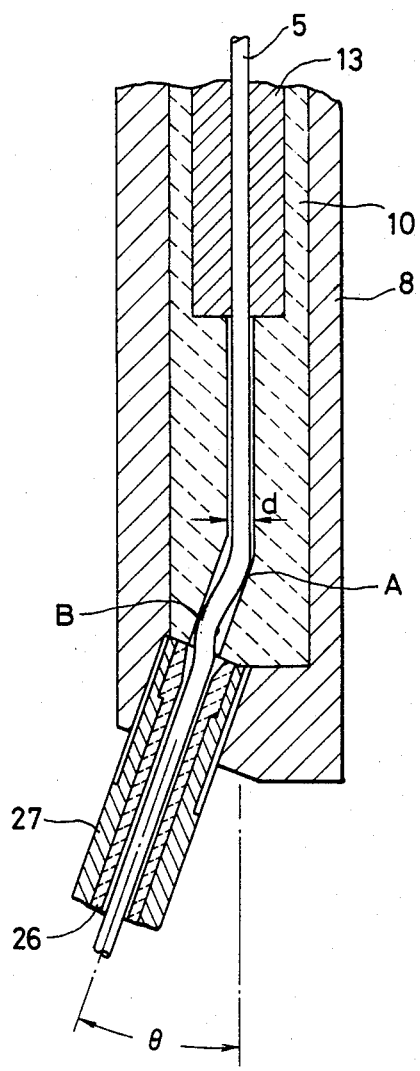
FIG. 2 is a cross-sectional view of a wire guide portion of the torch of FIG. 1.
Figure 3:
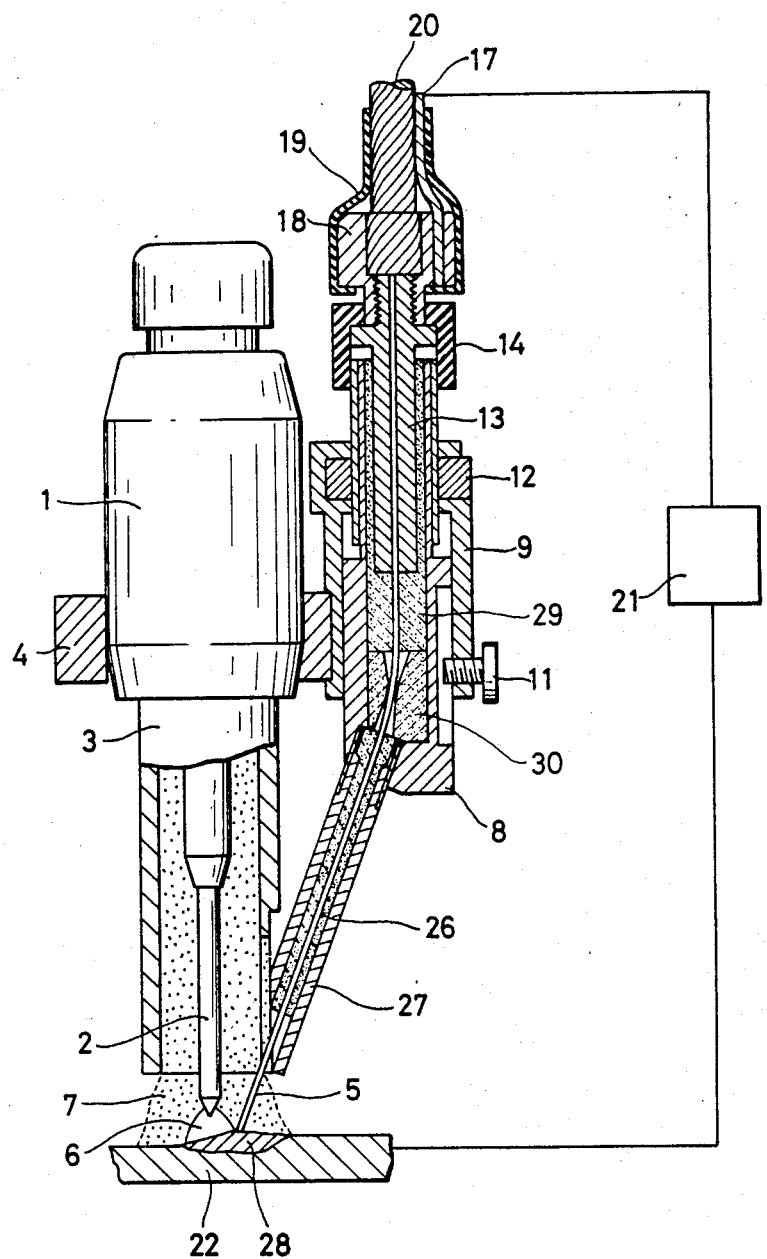
FIG. 3 is a cross-sectional view of a hot wire type electric arc welding torch of the invention.
Figure 4:
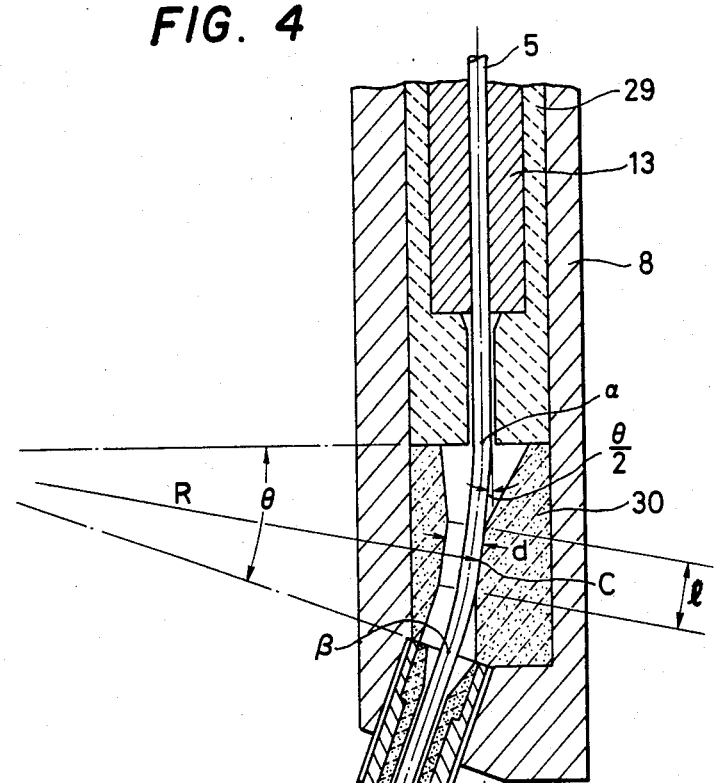
FIG. 4 is a cross-sectional view of a wire guide portion of the torch of FIG. 3.

FIGS. 3 and 4 show a hot wire type electric arc welding torch and a wire guide portion of the torch. Except for an insulative collar 29 and an insulative spacer 30 provided inside the sliding piece 8, the hot wire type electric arc welding torch of the invention is the same as the conventional apparatus as described by reference to FIGS. 1 and 2. Therefore, explanation of about the parts other than the insulative collar 29 and the insulative spacer 30 will be omitted.

The insulative collar 29 is made of a heat-resistant insulative material, such as a ceramic, and the collar 29 is provided with a hole in which a power supply tip 13 is fitted. A small diameter hole is bored in the insulative collar 29, and the hole is large enough for a wire to pass there-through.

The insulative spacer 30 is made of the same material as used for the insulative collar 29, and the insulative spacer 30 is designed so as to guide a wire 5 between the insulative collar 29 and the insulative guide 26 and to provide the wire with an insert angle of $\theta°$ relative to the TIG torch 1.

The operation of the insulative spacer 30 will now be explained. In order to feed the wire 5 to a weld puddle 28 while maintaining the wire insert angle $\theta°$ relative to the TIG torch, the insulative guide 26 and the guide 27 are fitted to the sliding piece 8 at an angle $\theta°$ relative to the power supply tip 13. Therefore, the wire 5 is bent through $\theta°$ between the lower end surface of the insulative collar 29 and the insulative guide 26, by the insulative spacer 30. In the insulative spacer 30 is bored a hole having a diameter "d" and a length "l" at an angle of $\theta/2°$ relative to the insulative collar 29. The inlet and outlet portions of the hole are tapered to make the resulting diameters greater than "d", so that the portion where the wire comes into contact with the insulative spacer 30 is minimized as much as possible. Therefore, the wire 5 leaving the power supply tip 13 comes into contact with a surface C of the insulative spacer 30, and the surface C bends the wire through an angle of $\theta/2°$ defined by the radius R, and the wire 5 is then sent to the insulative guide 26 while maintaining the radius R. During this time, the wire 5 is further bent through $\theta/2°$, and finally it is directed to the weld puddle 28 at an angle of $\theta°$. The term "radius R" is used herein to mean the radius of an arc of a circle passing through the center "$\alpha$" of the lower end surface of the insulative collar 29, the center "$\beta$" of the upper end surface of the insulative guide 26, and the point C where the wire 5 contacts the insulative spacer.

Preferably the diameter "d" is from 1.5 to 2.5 times the diameter of the wire 5, and the length "l" is from 0 to about 5 mm. This diameter and length were determined experimentally to give most favorable results.

Figure 5:
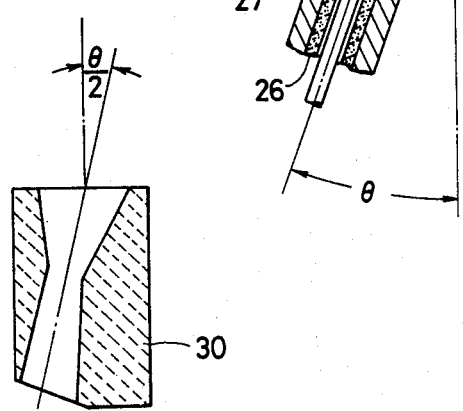
FIG. 5 is a cross-sectional view of an insulative spacer as used in the hot wire type electric arc welding torch of the invention.

In the above-described embodiment, a hole having a straight portion ("l") is provided in the interior of the insulative spacer 30. In addition, FIG. 5 illustrates another embodiment in which "l"=0, i.e., where the inlet and outlet tapered portions are connected directly to each other.

In the hot wire type electric arc welding torch of the invention, an insulative spacer is provided in a bent portion of a wire-guide section at an angle of one-half that at which the wire is to be fed to a weld puddle, and in order to minimize the frictional resistance between the wire and the insulative spacer, the inlet and outlet portions of the insulative spacer are produced in a tapered form, so that the portion where the wire contacts the insulative spacer is shortened. Thus, the hot wire type electric arc welding torch of the invention produces the effect of feeding a heated wire, i.e., a hot wire, to a welding section very stably and continuously.

We claim:

1. A hot wire type electric arc welding apparatus, comprising:
   a non-consumable electrode;
   a shielding-gas nozzle surrounding said non-consumable electrode, said shielding-gas nozzle discharging a shielding gas around said electrode;
   a welding torch containing said non-consumable electrode and said shielding-gas nozzle;
   a wire feeding unit located substantially parallel to said welding torch for feeding a wire through a first guide bore therein;
   means for heating and melting said wire;
   a first guide connected to said wire feeding unit, said first guide being inclined toward said welding torch, said first guide having an insulated portion for feeding said wire to said workpiece;
   an insulative spacer for guiding said wire from said wire feeding unit to said first guide, said insulative spacer having a second guide bore which forms an angle with said first guide bore for bending said wire, said insulative spacer having a tapered bore portion formed at each of wire inlet and outlet sides thereof.

2. The torch as claimed in claim 1, wherein said second guide bore has a diameter between 1.5 and 2.5 times that of the wire and a length between 0 and 5 mm.

3. The torch as claimed in claim 1, wherein said second guide bore has a diameter between 1.5 and 2.5 times that of said wire.

4. The torch as claimed in claim 1, wherein said first guide and insulated second guide are inclined toward said welding torch at an angle $\theta$ relative to said first guide bore, and said second guide bore formed in said insulative spacer is inclined at an angle of $\theta/2$ relative to said first guide bore.

5. The torch as claimed in claim 2, wherein said first guide and insulative second guide are inclined toward said welding torch at an angle $\theta$ relative to said first guide bore, and said second guide bore formed in said insulative spacer is inclined at an angle of $\theta/2$ relative to said first guide bore.

6. The torch as claimed in claim 3, wherein said first guide and insulative second guide are inclined toward said welding torch at an angle $\theta$ relative to said first guide bore, and said second guide bore formed in said insulative spacer is inclined at an angle of $\theta/2$ relative to said first guide bore.

7. The torch as claimed in claim 1 wherein said tapered escape bores of said insulative spacer confront said second guide bore, said tapered escape bores being tapered outward from said second guide bore and having a diameter substantially equal to said second guide bore at portions which confront said second guide bore.

8. An electric arc welding apparatus, comprising;
a welding torch having an electrode and extending in a first direction;
a wire feeding unit arranged substantially parallel to said welding torch, and including a first wire guide extending substantially parallel to said welding torch and a second wire guide inclined at an angle $\theta$ toward said welding torch; and
wire bending means for diverting said wire from said first wire guide to said second wire guide, said bending means including an inwardly tapered wire inlet, an outwardly tapered wire outlet and a wire contacting surface, said wire contacting surface being arranged at an angle $\alpha$ such that $\alpha < \theta$.

* * * * *